(12) United States Patent
Nam et al.

(10) Patent No.: US 9,321,885 B2
(45) Date of Patent: Apr. 26, 2016

(54) ENVIRONMENTALLY-FRIENDLY SHEET USING PLA RESIN

(75) Inventors: Seung Baik Nam, Cheongju-si (KR); Jeong Ho Jeong, Bucheon-si (KR); Jong Seok Son, Cheongju-si (KR)

(73) Assignee: LG HAUSYS, LTD., Seoul (KR)

( * ) Notice: Subject to any disclaimer, the term of this patent is extended or adjusted under 35 U.S.C. 154(b) by 136 days.

(21) Appl. No.: 14/237,402

(22) PCT Filed: Aug. 16, 2012

(86) PCT No.: PCT/KR2012/006494
§ 371 (c)(1),
(2), (4) Date: Feb. 6, 2014

(87) PCT Pub. No.: WO2013/025048
PCT Pub. Date: Feb. 21, 2013

(65) Prior Publication Data
US 2014/0170394 A1    Jun. 19, 2014

(30) Foreign Application Priority Data

Aug. 18, 2011    (KR) .................. 10-2011-0082381

(51) Int. Cl.
| | | |
|---|---|---|
| C08G 64/42 | (2006.01) |
| B32B 27/20 | (2006.01) |
| B32B 27/22 | (2006.01) |
| B32B 27/36 | (2006.01) |
| C08K 3/22 | (2006.01) |
| C08K 3/26 | (2006.01) |
| C08K 5/11 | (2006.01) |
| B32B 27/12 | (2006.01) |
| B32B 27/16 | (2006.01) |
| B32B 27/18 | (2006.01) |
| B32B 27/26 | (2006.01) |
| C08K 5/00 | (2006.01) |
| C08J 5/18 | (2006.01) |
| C08K 5/09 | (2006.01) |
| C08K 5/14 | (2006.01) |
| C08K 5/23 | (2006.01) |

(52) U.S. Cl.
CPC ............... *C08G 64/42* (2013.01); *B32B 27/12* (2013.01); *B32B 27/16* (2013.01); *B32B 27/18* (2013.01); *B32B 27/20* (2013.01); *B32B 27/22* (2013.01); *B32B 27/26* (2013.01); *B32B 27/36* (2013.01); *C08J 5/18* (2013.01); *C08K 3/22* (2013.01); *C08K 3/26* (2013.01); *C08K 5/0016* (2013.01); *C08K 5/09* (2013.01); *C08K 5/11* (2013.01); *C08K 5/14* (2013.01); *C08K 5/235* (2013.01); *B32B 2260/046* (2013.01); *B32B 2262/101* (2013.01); *B32B 2307/7163* (2013.01); *B32B 2419/00* (2013.01); *C08J 2367/04* (2013.01); *Y10T 428/24868* (2015.01)

(58) Field of Classification Search
None
See application file for complete search history.

(56) References Cited

FOREIGN PATENT DOCUMENTS

| | | | |
|---|---|---|---|
| EP | 2711178 | A2 | 3/2014 |
| JP | 05177800 | A | 7/1993 |
| JP | 09194696 | A | 7/1997 |
| JP | 2003128901 | A | 5/2003 |
| JP | 2006063302 | A | 3/2006 |
| JP | 2008231302 | A | 10/2008 |
| JP | 2011116949 | A | 6/2011 |
| JP | 2013504702 | A | 2/2013 |
| KR | 20010048271 | A | 6/2001 |
| KR | 20070120248 | A | 12/2007 |
| KR | 20080067424 | A | 7/2008 |
| KR | 20100036872 | A | 4/2010 |
| KR | 20110032536 | A | 3/2011 |
| WO | 2011032727 | A1 | 3/2011 |
| WO | 2011037325 | A2 | 3/2011 |

OTHER PUBLICATIONS

Extended European Search Report dated Jun. 27, 2014.
Japanese Office Action dated Dec. 9, 2014.
International Search Report for PCT/KR2012/006494 mailed on Feb. 28, 2013.

*Primary Examiner* — Susannah Chung
*Assistant Examiner* — Robert T Butcher
(74) *Attorney, Agent, or Firm* — Hauptman Ham, LLP

(57) ABSTRACT

Disclosed is an environmentally-friendly sheet using a PLA resin. The environmentally-friendly sheet using the PLA resin according to the present invention comprises: a back layer; a printed layer which is formed on the upper part of the back layer, wherein a printing pattern is formed on the upper surface thereof; and a transparent layer formed on the upper part of the printed layer, wherein one or more of the back layer, the printed layer, and the transparent layer have a PLA (polylactic acid) resin.

7 Claims, 1 Drawing Sheet

ENVIRONMENTALLY-FRIENDLY SHEET USING PLA RESIN

TECHNICAL FIELD

The present invention relates to multilayer sheets, and more particularly, to an environmentally friendly sheet including at least one layer formed of a biodegradable resin, which is modified through thermally initiated cross-linking reaction, allows easy processing, exhibits excellent mechanical properties after processing, and includes a PLA resin.

BACKGROUND ART

Sheets using petroleum resins such as polyvinyl chloride (PVC) are widely used in various building structures such as houses, mansions, apartments, offices, stores, and the like.

Such sheets are produced by extrusion or calendering of resins such as polyvinyl chloride (PVC). Raw materials for these sheets are exclusively derived from limited resources such as crude oil. It is thus anticipated that depletion of petroleum resources will lead to various problems related to the supply of raw materials.

As interest in environmental issues is recently growing in importance, polyvinyl chloride (PVC) sheets are problematic in that they are likely to emit harmful substances and create an environmental burden when discarded.

To solve such problems, a polylactic acid (PLA) resin extracted and synthesized from plant resources has attracted attention as a material capable of replacing petroleum based resins in recent years.

Environmentally friendly sheets using such a PLA resin are disclosed in prior documents including Korean Patent Laid-open Publication No. 10-2008-0067424.

However, a PLA resin-based sheet has a drawback in that the sheet clings to a processing apparatus upon thermal lamination, or is not easily stacked in multiple layers due to lack of viscoelasticity upon processing at high temperature, as compared with sheets prepared from an existing PVC resin.

DISCLOSURE

Technical Problem

An aspect of the present invention is to provide an environmentally friendly sheet, which includes at least one layer formed of a biodegradable resin including a PLA resin, allows easy thermal lamination due to improved melt strength through modification of the biodegradable resin through thermally initiated cross-linking reaction, as compared with a biodegradable resin including an existing PLA resin, and exhibits excellent mechanical properties after processing.

Technical Solution

In accordance with an aspect of the present invention, an environmentally friendly sheet includes at least one layer, wherein the at least one layer includes a biodegradable resin including: a PLA resin; a thermal initiator; and a cross-linking monomer, and being modified through thermally initiated cross-linking reaction.

Advantageous Effects

According to the invention, since the biodegradable resin including a PLA resin is modified through thermally initiated cross-linking reaction, the environmentally friendly sheet using the PLA resin exhibits increased melt strength due to cross-linking between molecular chains, allows easy thermal processing, and has improved physical properties in terms of tensile strength, elongation, and the like after processing.

In addition, since the environmentally friendly sheet uses a plant resource-based PLA resin instead of a petroleum-based PVC resin, which is generally used as a binder, the environmentally friendly sheet can solve the problem of securing raw materials due to depletion of petroleum resources.

Further, the environmentally friendly sheet using a PLA resin is environmentally friendly in that the sheet discharges less toxic substances, such as $CO_2$ and the like, and allows easy disposal.

BEST MODE

Figure 1:
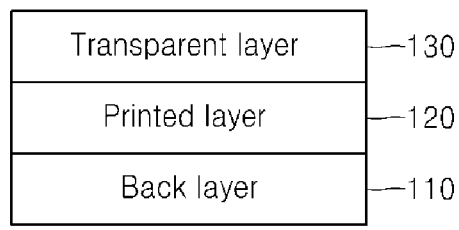
FIGS. 1 and 2 show environmentally friendly sheets using a PLA resin according to embodiments of the present invention.

The above and other aspects, features, and advantages of the present invention will become apparent from the detailed description of the following embodiments in conjunction with the accompanying drawings. However, it should be understood that the present invention is not limited to the following embodiments and may be embodied in different ways, and that the embodiments are provided for complete disclosure and thorough understanding of the invention by those skilled in the art. The scope of the invention should be limited only by the accompanying claims and equivalents thereof. Like components will be denoted by like reference numerals throughout the specification.

Hereinafter, an environmentally friendly sheet using a PLA resin according to embodiments of the present invention will be described in detail with reference to the accompanying drawings.

Figure 2:
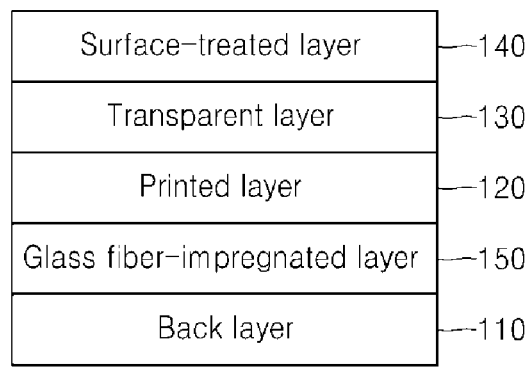

FIGS. 1 and 2 are sectional views of environmentally friendly sheets using a PLA resin according to embodiments of the present invention.

Referring to FIG. 1, an environmentally friendly sheet according to one embodiment of the invention includes a back layer 110, a printed layer 120, and a transparent layer 130. Here, in the sheet according to this embodiment, at least one layer among the back layer 110, the printed layer 120 and the transparent layer 130 includes a biodegradable resin, which includes a polylactic acid (PLA) resin and is modified through thermally initiated cross-linking reaction.

FIG. 2 is a sectional view of an environmentally friendly sheet using a PLA resin according to another embodiment of the present invention.

Referring to FIG. 2, an environmentally friendly sheet according to this embodiment includes a back layer 110, a printed layer 120, a transparent layer 130, a surface-treated layer 140, and a glass fiber-impregnated layer 150. Here, in the sheet according to this embodiment, at least one layer among the back layer 110, the printed layer 120, the transparent layer 130, the surface-treated layer 140 and the glass fiber-impregnated layer 150 includes a biodegradable resin, which includes a polylactic acid (PLA) resin and is modified through thermally initiated cross-linking reaction.

According to one embodiment of the present invention, an environmental friendly sheet includes at least one layer, wherein the at least one layer includes a biodegradable resin including: a PLA resin; a thermal initiator; and a cross-linking monomer. Here, the biodegradable resin is modified through thermally initiated cross-linking reaction.

According to the present invention, the PLA resin is a main component of the biodegradable resin and includes a thermoplastic polyester of lactide or lactic acid. For example, the PLA resin may be prepared by polymerization of lactic acid, which can be obtained by fermentation of starch extracted from corn, potato, and the like. Since corn, potato and the like are renewable plant resources, the PLA resin obtained from such resources can effectively deal with problems due to depletion of petroleum resources.

In addition, the PLA resin is an environmentally friendly material in that it discharges remarkably less toxic substances to the environment, e.g. $CO_2$, in use or disposal than petroleum-based materials, e.g. polyvinyl chloride (PVC), and thus has eco-friendly characteristics of ready biodegradation.

The PLA resins may be classified into crystalline PLA (c-PLA) resins and amorphous PLA (a-PLA) resins. Here, since a sheet using a crystalline PLA resin can suffer from bleeding, a phenomenon in which a plasticizer flows out of a surface of the sheet, it is desirable that the amorphous PLA resin be used. When the amorphous PLA resin is used, there is a merit in that a compatibilizer, which is necessarily added for prevention of bleeding, can be omitted. When the amorphous PLA resin is used, it is desirable that the amorphous PLA resin be used as the PLA resin at 100%. In addition, a PLA resin including both crystalline and amorphous PLA resins may also be used, as needed.

According to the present invention, the biodegradable resin includes the thermal initiator in order to generate cross-linking reaction by heat.

The thermal initiator may be a radical initiator which is degraded by heat generated during a process, such as lamination and the like, and forms radicals.

According to the invention, the thermal initiator may include an azo-based compound or a peroxide-based compound.

Specifically, examples of the azo-based compound may include 2,2'-azobis(2-methylbutyronitrile), 2,2'-azobis (isobutyronitrile), 2,2'-azobis(2,4-dimethylvaleronitrile), and 2,2'-azobis(4-methoxy-2,4-dimethylvaleronitrile), without being limited thereto. In addition, examples of the peroxide compound may include tetramethylbutyl peroxyneodecanoate (e.g. Perocta ND, NOF Co., Ltd.), bis(4-butylcyclohexyl) peroxydicarbonate (e.g. Peroyl TCP, NOF CO., LTD.), di(2-ethylhexyl) peroxycarbonate, butyl peroxyneodecanoate (e.g. Perbutyl ND, NOF CO., LTD.), dipropyl peroxydicarbonate (e.g. Peroyl NPP, NOF CO., LTD.), diisopropyl peroxydicarbonate (e.g. Peroyl IPP, NOF CO., LTD.), diethoxyethyl peroxydicarbonate (e.g. Peroyl EEP, NOF CO., LTD.), diethoxyhexyl peroxydicarbonate (e.g. Peroyl OEP, NOF CO., LTD.), hexyl peroxydicarbonate (e.g. Perhexyl ND, NOF CO., LTD.), dimethoxybutyl peroxydicarbonate (e.g. Peroyl MBP, NOF CO., LTD.), bis(3-methoxy-3-methoxybutyl) peroxydicarbonate (e.g. Peroyl SOP, NOF CO., LTD.), dibutyl peroxydicarbonate, dicetyl peroxydicarbonate, dimyristyl peroxydicarbonate, 1,1,3,3-tetramethylbutyl peroxypivalate, hexyl peroxypivalate (e.g. Perhexyl PV, NOF CO., LTD.), butyl peroxypivalate (e.g. Perbutyl, NOF CO., LTD.), trimethyl hexanoyl peroxide (e.g. Peroyl 355, NOF CO., LTD.), dimethyl hydroxybutyl peroxyneodecanoate (e.g. Luperox 610M75, Atofina Co., Ltd.), amyl peroxyneodecanoate (e.g. Luperox546M75, Atofina Co., Ltd.), butyl peroxyneodecanoate (e.g. Luperox 10M75, Atofina Co., Ltd.), t-butyl peroxyneoheptanoate, amyl peroxypivalate (e.g. Luperox 546M75, Atofina Co., Ltd.), t-butyl peroxypivalate, t-amyl peroxy-2-ethylhexanoate, lauryl peroxide, dilauroyl peroxide, didecanoyl peroxide, benzoyl peroxide, and dibenzoyl peroxide, without being limited thereto.

The thermal initiator may be present in an amount of 0.1 parts by weight to 10 parts by weight based on 100 parts by weight of the PLA resin. If the amount of the thermal initiator is less than 0.1 parts by weight, it is difficult to provide sufficient radical reaction, and if the amount of the thermal initiator is greater than 10 parts by weight, the environmentally friendly sheet can have deteriorated properties due to deterioration of the PLA resin by the unreacted initiator.

According to the invention, the biodegradable resin includes a monomer serving as a bridge formed between molecular chains of the PLA resin by cross-linking reaction.

The monomer may allow a polymer polymerized therefrom to exhibit excellent properties in terms of melt strength, transparency, UV stability, water resistance, solvent resistance and the like, and may be easily polymerized by heat. Specifically, the monomer may include at least one selected from among monofunctional or polyfunctional group-containing acrylate and methacrylate monomers.

The monomer may be present in an amount of 0.1 parts by weight to 10 parts by weight based on 100 parts by weight of the PLA resin. If the amount of the monomer is less than 0.1 parts by weight, there is a problem of insufficient improvement in properties such as melt strength and the like, and if the amount of the monomer is greater than 10 parts by weight, the environmentally friendly sheet including layers can be deteriorate in overall properties due to problems, such as insufficient compatibility between the monomer and other materials included in the layers, and the like.

Since the environmentally friendly sheet has a stacked structure, the biodegradable resin including the PLA resin is prepared in the form of a sheet or film, and calendering or extrusion is used to prepare the biodegradable resin in the form of a sheet or film. To this end, the biodegradable resin according to the present invention may further include a plasticizer.

The plasticizer may be a non-phthalate plasticizer which is environmentally friendly. The plasticizer increases thermoplasticity of the PLA resin by softening the PLA resin, and thus allows the PLA resin to be easily molded at high temperature. The non-phthalate plasticizer may include at least one selected from among acetyl tributyl citrate (ATBC), and tributyl citrate (TBC).

The non-phthalate plasticizer may be present in an amount of 5 parts by weight to 100 parts by weight based on 100 parts by weight of the PLA resin. If the amount of the plasticizer is less than 5 parts by weight, the sheet can be deteriorated in processability due to high hardness of the PLA resin, and if the amount of the plasticizer is greater than 100 parts by weight, despite improved plasticity and flexibility, the sheet can suffers from bleeding, which means that the plasticizer flows out of a surface of the sheet, due to use of excess plasticizer.

In addition, the biodegradable resin according to the invention may further include a lubricant, calcium carbonate ($CaCO_3$) as inorganic fillers for reinforcement, titanium dioxide ($TiO_2$) as a white pigment for aesthetics, and the like. The lubricant prevents the biodegradable resin from sticking to a calender roll or a press during processing of the resin, such as calendering, extrusion, and the like. Although various types of lubricants can also be used, the lubricant may include environmentally friendly higher fatty acids. For example, the lubricant may include stearic acid, which is a $C_{18}$ saturated higher fatty acid.

The lubricant may be present in an amount of 0.1 parts by weight to 10 parts by weight based on 100 parts by weight of the PLA resin. If the amount of the lubricant is less than 0.1 parts by weight, the PLA resin does not provide effects obtained by use of the lubricant, and if the amount of the lubricant is greater than 10 parts by weight, the PLA resin can be deteriorated in impact resistance, heat resistance, gloss, and the like.

Calcium carbonate may be present in an amount of 5 parts by weight to 1,000 parts by weight based on 100 parts by weight of the PLA resin.

In addition, titanium dioxide may be present in an amount of 0.5 parts by weight to 50 parts by weight based on 100 parts by weight of the PLA resin.

If the amount of calcium carbonate or titanium dioxide exceeds the above range, the environmentally friendly sheet can be deteriorated in processability due to deterioration of bonding strength to other components.

Hereinafter, the back layer 110, the printed layer 120, the transparent layer 130, the surface-treated layer 140, and the glass fiber-impregnated layer 150 will be described in detail.

According to the invention, the back layer 110 is the most basic layer of the sheet, and serves to support the printed layer 120 and the transparent layer 130 on an upper side thereof and to absorb shock applied to an upper or lower side of the sheet.

The back layer 110 may have a thickness from 1.0 mm to 5.0 mm. If the thickness of the back layer 110 is less than 1.0 mm, the back layer cannot properly provide such functions, and if the thickness of the back layer 110 is greater than 5.0 mm, manufacturing costs of the sheet are increased due to use of large amounts of the PLA resin and the like.

As described above, the back layer 110 includes the biodegradable resin, which includes the PLA resin, the thermal initiator and the monomer, and is modified by thermally initiated cross-linking reaction during processing. Here, the biodegradable resin may further include a lubricant, calcium carbonate, titanium dioxide, and the like. These may be used alone or in combination thereof.

According to the invention, the printed layer 120 formed on an upper side of the back layer 110 includes a pattern formed on an upper surface thereof by various methods such as transfer printing, gravure printing, screen printing, offset printing, rotary or flexo-printing, inkjet printing, and the like, and thus serves to impart aesthetics to the sheet.

The printed layer 120 may have a thickness from 0.01 mm to 0.3 mm. If the thickness of the printed layer 120 is less than 0.01 mm, pattern printing can be difficult, and if the thickness of the printed layer 120 is greater than 0.3 mm, manufacturing costs of the sheet are increased.

As described above, the printed layer 120 includes the biodegradable resin, which includes the PLA resin, the thermal initiator and the monomer, and is modified by thermally initiated cross-linking reaction during processing. Here, the biodegradable resin may further include a lubricant, calcium carbonate, titanium dioxide, and the like. These may be used alone or in combination thereof.

According to the invention, the transparent layer 130 formed on an upper side of the printed layer 120 serves to impart bulkiness to the sheet, and to protect the pattern formed on the upper surface of the printed layer 120.

The transparent layer 130 may have a thickness from 0.10 mm to 1.0 mm. If the thickness of the transparent layer 130 is less than 0.10 mm, the transparent layer 130 cannot effectively protect the pattern formed on the printed layer 120 and the sheet can be deteriorated in bulkiness, and if the thickness of the transparent layer 130 is greater than 1.0 mm, manufacturing costs of the sheet can be increased without further improvement of the effects.

As described above, the transparent layer 130 includes the biodegradable resin, which includes the PLA resin, the thermal initiator and the monomer, and is modified by thermally initiated cross-linking reaction during processing. Here, the biodegradable resin may further include a lubricant, calcium carbonate, titanium dioxide, and the like. These may be used alone or in combination thereof.

According to the invention, the surface-treated layer 140 is formed on the transparent layer 130 for improvement of surface quality of the sheet, such as scratch resistance or abrasion resistance, easy cleaning through improvement of anti-fouling properties, and the like.

The surface-treated layer 140 may have a thickness from 0.01 mm to 0.1 mm. If the thickness of the surface-treated layer 140 is less than 0.01 mm, it is difficult to achieve improvement in properties of the sheet, such as scratch resistance and the like, and if the thickness of the surface-treated layer 140 is greater than 0.10 mm, an excess of manufacturing costs is required for formation of the surface-treated layer, and the sheet can be deteriorated in external appearance.

As described above, the surface-treated layer 140 includes the biodegradable resin, which includes the PLA resin, the thermal initiator and the monomer, and is modified by thermally initiated cross-linking reaction during processing. Here, the biodegradable resin may further include a lubricant, and the like.

According to the invention, the glass fiber-impregnated layer 150 serves to protect a backside opposing a surface of the sheet and to absorb shock applied to an upper or lower side of the sheet.

The glass fiber-impregnated layer 150 may have a thickness from 1.0 mm to 5.0 mm. If the thickness of the glass fiber-impregnated layer 150 is less than 1.0 mm, the glass fiber-impregnated layer 150 cannot properly perform the above functions, and if the thickness of the glass fiber-impregnated layer 150 is greater than 5.0 mm, manufacturing costs are increased due to use of excess PLA resin and the like.

The glass fiber-impregnated layer 150 includes glass fibers and a binder resin. Here, the binder resin includes the biodegradable resin, which includes the PLA resin, the thermal initiator and the monomer, and is modified by thermally initiated cross-linking reaction during processing.

According to the invention, the environmentally friendly sheet may be prepared by any method without limitation. For example, the environmentally friendly sheet may be prepared by mixing and kneading raw materials of the biodegradable resin including the PLA resin, followed by calendering the mixture into a desired sheet shape.

Here, when the thermal initiator included in the biodegradable resin according to the invention degrades into radicals using processing heat during kneading of the raw materials, cross-linking reaction between the PLA resin and the monomer is started.

Mixing and kneading of the raw materials in a liquid or powder state may be performed using, for example, a super mixer, extruder, kneader, 2-roll or 3-roll machine, and the like. In addition, for more efficient mixing and kneading of the raw materials, mixing and kneading may be repeatedly performed through multiple stages by kneading the raw materials at about 120° C. to about 200° C. using a Banbury mixer, followed by primary and secondary mixing of the kneaded raw materials at about 120° C. to about 200° C. using a 2-roll machine or the like.

In addition, there is no particular restriction as to a method of manufacturing each layer of the sheet such as the back layer and the like, which includes subjecting the mixed components to calendering. For example, each layer may be formed using a general device, for example, a 4-roll inverted L-type calender, and the like.

Further, calendering conditions may be suitably adjusted in consideration of compositions of a used resin composition. For example, calendering may be carried out at a temperature ranging from about 120° C. to about 200° C.

Preparation of Sheet According to Example and Comparative Example

Hereinafter, the present invention will be explained in more detail with reference to some examples. It should be understood that these examples are provided for illustration only and are not to be in any way construed as limiting the present invention.

Descriptions of details apparent to those skilled in the art will be omitted.

Example 100 parts by weight of a PLA resin, 25 parts by weight of ATBC, 10 parts by weight of an acrylate monomer, 1 part by weight of dialkyl peroxide, and 5 parts by weight of stearic acid were kneaded at 150° C. in a Banbury mixer, thereby performing sufficient cross-linking reaction by thermal initiation.

The raw materials kneaded in the Banbury mixer were subjected to primary and secondary mixing using a 2-roll machine at 140° C.

The mixed raw materials were subjected to calendering at 130° C., thereby preparing 0.4 mm thick sheet samples for flooring materials. Next, the sheet samples were stacked.

Here, the sheet samples were stacked using a heating drum, which uses a heated steam heat source, and an embossing machine. Generally, thermal lamination was performed under conditions of the heating drum having a surface temperature from 120° C. to 150° C. as in a stacking process of a PVC sheet, thereby providing a stacked structure.

Comparative Example

Sheet samples were prepared in the same manner as in Example except that dialkyl peroxide was not added. Next, the sheet samples were stacked.

Evaluation

The stacked sheet samples prepared in Example and Comparative Example were evaluated as to stacking processability and tensile strength. Results are shown in Table 1.

TABLE 1

|  | Example | Comparative Example |
| --- | --- | --- |
| Stacking processability | Stacking was easily performed under conditions of heating drum having a surface temperature of 120° C. to 150° C. | Stacking processability was extremely poor due to sticking of the sheet sample to a surface of the heating drum. |
| Tensile strength (KS M3802) | 90.3 kgf/cm$^2$ | 65.4 kgf/cm$^2$ |

As shown in Table 1, it could be seen that the sheet according to the present invention was easily stacked even at a relatively high temperature and exhibited excellent strength after processing since the sheet was prepared using a biodegradable resin modified through thermally initiated cross-linking reaction.

Although some embodiments have been disclosed herein, it should be understood by those skilled in the art that these embodiments are provided by way of illustration only, and that various modifications, changes, and alterations can be made without departing from the spirit and scope of the invention. The scope of the invention should be limited only by the accompanying claims and equivalents thereof.

The invention claimed is:

1. A sheet comprising at least one layer,
wherein the sheet has a stacked structure, including:
a surface-treated layer having a thickness ranging from 0.01 mm to 0.1 mm,
a transparent layer having a thickness ranging from 0.10 mm to 1.0 mm,
a printed layer having a thickness ranging from 0.01 mm to 0.3 mm,
a glass fiber-impregnated layer having a thickness ranging from 1.0 mm to 5.0 mm, and
a back layer having a thickness ranging from 1.0 mm to 5.0 mm, in sequence;
wherein the at least one layer comprises a biodegradable resin made from a thermally initiated crosslinking reaction of a composition comprising:
a polylactic acid (PLA) resin;
a thermal initiator chosen from azo-compounds; and
a cross-linking monomer;
wherein the transparent layer and the printed layer and the back layer include calcium carbonate in an amount ranging from 5 to 1,000 parts by weight and titanium dioxide in an amount ranging from 0.5 to 50 parts by weight based on 100 parts by weight of the PLA resin; and
wherein the printed layer formed on an upper side of the back layer includes a pattern formed on an upper surface thereof by transfer printing.

2. The sheet according to claim 1, wherein the thermal initiator is present in an amount of 0.1 parts by weight to 10 parts by weight based on 100 parts by weight of the PLA resin.

3. The sheet according to claim 1, wherein the cross-linking monomer comprises at least one selected from among acrylate and methacrylate monomers.

4. The sheet according to claim 1, wherein the cross-linking monomer is present in an amount of 0.1 parts by weight to 10 parts by weight based on 100 parts by weight of the PLA resin.

5. The sheet according to claim 1, wherein the biodegradable resin further comprises a non-phthalate plasticizer.

6. The sheet according to claim 5, wherein the non-phthalate plasticizer is present in an amount of 5 parts by weight to 100 parts by weight based on 100 parts by weight of the PLA resin.

7. The sheet according to claim 1, wherein the biodegradable resin further comprises: 0.1 parts by weight to 10 parts by weight of a lubricant, based on 100 parts by weight of the PLA resin.

* * * * *